United States Patent [19]
Buswell et al.

[11] Patent Number: 5,918,039
[45] Date of Patent: Jun. 29, 1999

[54] METHOD AND APPARATUS FOR DISPLAY OF WINDOWING APPLICATION PROGRAMS ON A TERMINAL

[75] Inventors: Randy Buswell, Milpitas; Carol A. Fox, Fremont; Bill Gay, Piedmont; Sui M. Lam, Fremont; Curtis Schwebke, San Jose; Yih-Shyoun Wey, Fremont, all of Calif.

[73] Assignee: Wyse Technology, Inc., San Jose, Calif.

[21] Appl. No.: 08/581,168

[22] Filed: Dec. 29, 1995

[51] Int. Cl.$^6$ .................................. G06F 5/00; G06F 3/14
[52] U.S. Cl. .......................... 395/527; 395/335; 395/326; 395/500.45
[58] Field of Search ..................................... 395/500, 335, 395/326

[56] References Cited

U.S. PATENT DOCUMENTS

| | | | |
|---|---|---|---|
| 4,937,036 | 6/1990 | Beard et al. | 395/500 |
| 5,404,445 | 4/1995 | Matsumoto | 345/520 |
| 5,432,935 | 7/1995 | Kato et al. | 395/500 |
| 5,502,808 | 3/1996 | Goddard et al. | 345/501 |
| 5,673,403 | 9/1997 | Brown et al. | 395/335 |
| 5,680,530 | 10/1997 | Selfridge et al. | 395/335 |
| 5,809,559 | 9/1998 | Kim | 395/183.04 |

*Primary Examiner*—Tariq R. Hafiz
*Assistant Examiner*—John Q. Chavis
*Attorney, Agent, or Firm*—James E. Eakin

[57] ABSTRACT

A video display terminal capable of operating with a graphical user interface such as Windows® provides windowing functionality to permit use of popular applications programs resident on a server, without requiring more than application data to be transmitted from the server, and keyboard and mouse information to be transmitted from the terminal to the server. In addition, a method for updating terminal operating characteristics over a communications link from a host is disclosed. Finally, method and apparatus are disclosed for implementing multiple personalities within a terminal and switching among such personalities.

3 Claims, 9 Drawing Sheets

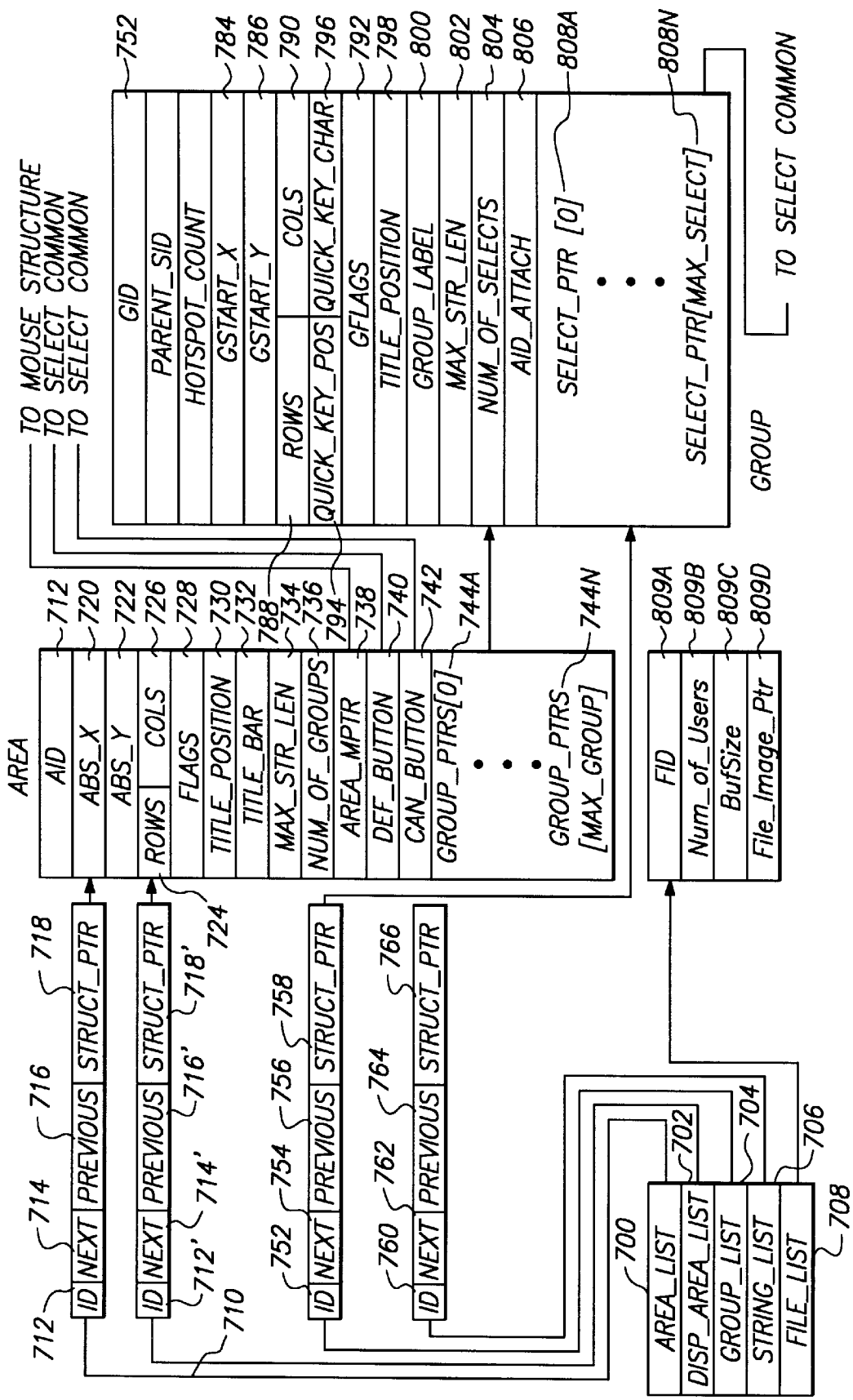
FIG. 7B1

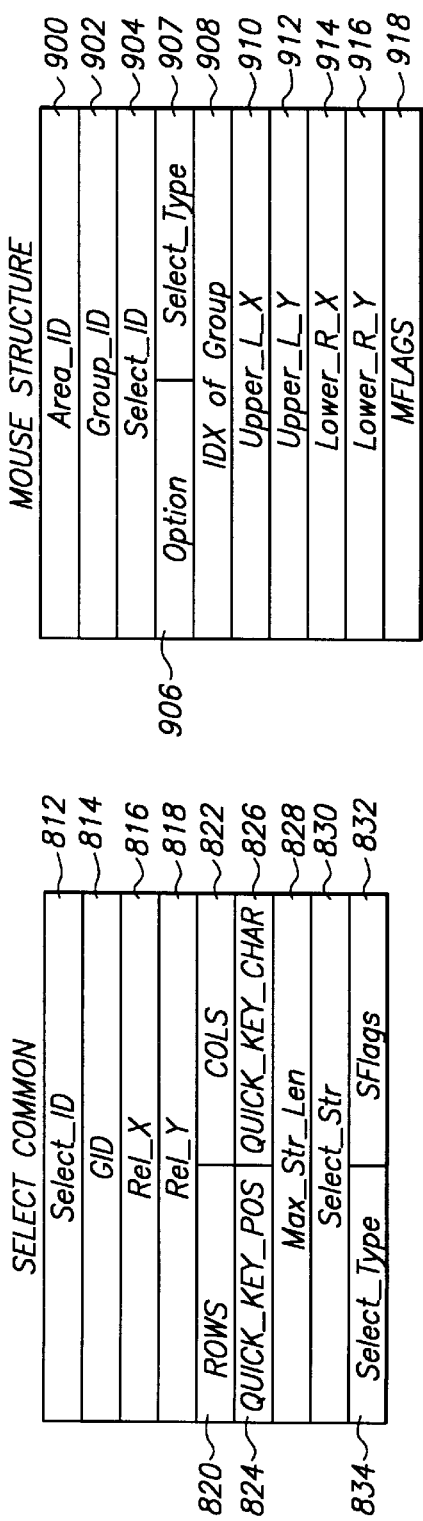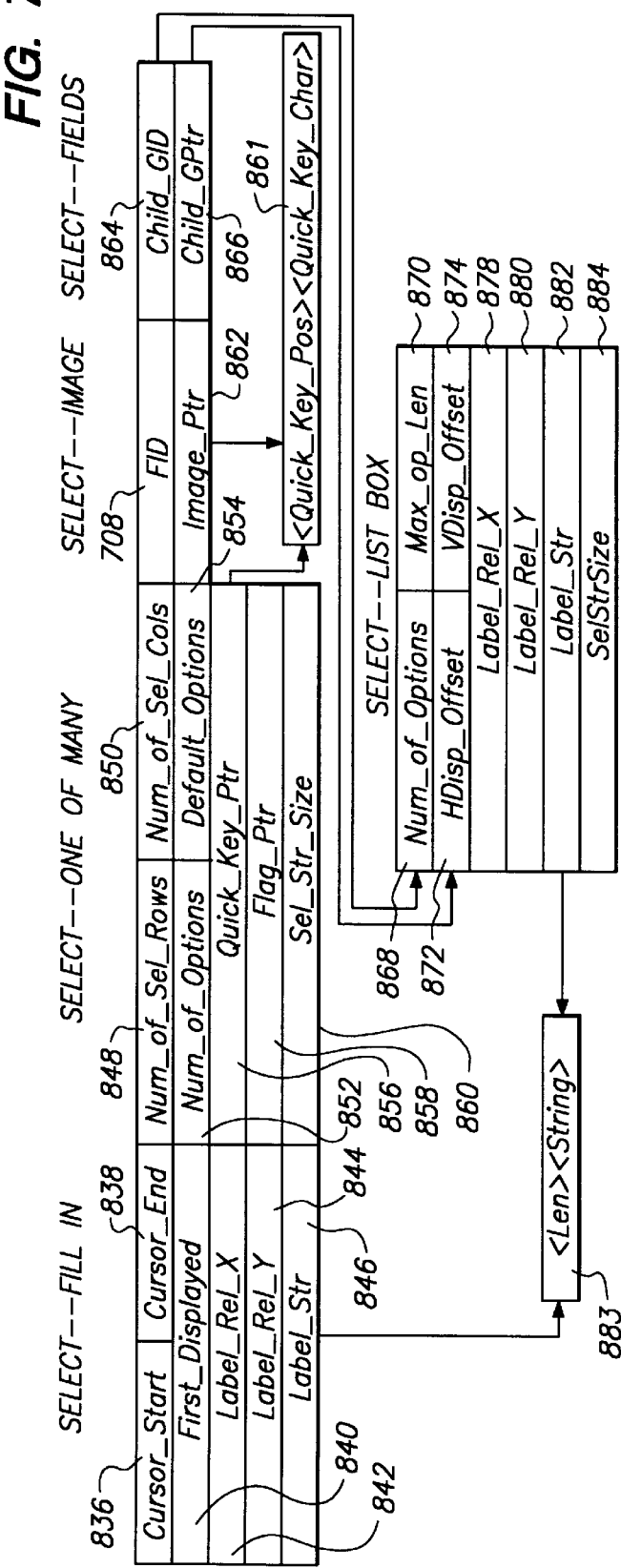
FIG. 7B2

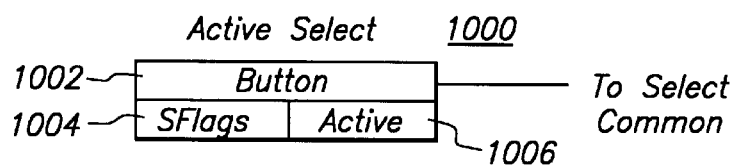
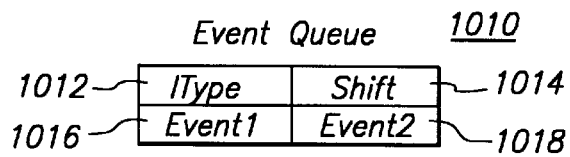
FIG. 7B3

METHOD AND APPARATUS FOR DISPLAY OF WINDOWING APPLICATION PROGRAMS ON A TERMINAL

FIELD OF THE INVENTION

The present invention relates generally to methods and apparatus for displaying information on a terminal, and more particularly relates to methods and apparata for formatting and displaying, on a terminal, graphical user interfaces such as the Microsoft Windows® operating environment and applications programs within such environments.

BACKGROUND OF THE INVENTION

Graphical user interfaces such as the Microsoft Windows® operating environment comprise the most popular operating environment for the world's best selling applications software. Such environments are typically preferred because of ease of use, uniformity of user interface, high quality display, as well as other reasons.

However, such user environments were designed for use with workstations and microcomputers such as personal computers. Such workstations and microcomputers, while flexible, present difficulties with security, reliability, ease of administration, and value. While data terminals are known to offer the advantages of improved security and ease of administration relative to microcomputers, and usually at lower cost, terminals have generally been unable to provide compatibility with the most popular graphical user interfaces. Terminals operating in the X environment can provide some graphical interface capabilities operating under Unix®, but typically are expensive, require extensive memory, and offer little compatibility with the most popular Windows environments.

Another option known in the prior art is diskless PCS. However, diskless PCS offer several deficiencies. In most instances, diskless PCS operating in a client server environment display application program information by downloading the application from the server and executing the application locally. This requires the diskless PC to have whatever processing power is required for each application it attempts to execute. In today's environment, this can require eight or more megabytes of memory, a powerful processor, and so on—making a diskless PC expensive. In addition, diskless PCS offer limited security and can require extensive administration.

The Windows® NT operating system provides a robust network client/server environment, while at the same time offering compatibility at the applications program level with the popular Windows® environment. However, the NT operating system was written for PC clients, and not terminals. As a result, NT clients are generally required to be robust and, as a result, expensive. In addition, Windows NT was written for the client/server environment, and not the multiuser environment. The WinFrame operating system, recently offered by Citrix Systems, Inc., modifies the Windows NT operating system by extending it to operate in a multiuser environment, although the prior art application for WinFrame has been PCS clients as opposed to terminals.

There has therefore been a need for a terminal which is relatively inexpensive, reliable, easy to administer, secure and capable of displaying application program information within a multiuser Windows® operating environment.

SUMMARY OF THE INVENTION

The present invention provides an elegant solution to the shortcomings of the prior art, in that it provides an inexpensive terminal capable of displaying applications software compatible with a windowing environment.

In particular, the present invention provides a display terminal capable of communicating with an applications server running a multiuser operating system. This provides secure access to Windows applications at the desktop. In an exemplary configuration, an application server is provided in the form of any suitable computer running the Winframe™ operating system provided by Citrix Systems, Inc. The WinFrame™ operating system incorporates the Windows NT operating system plus extensions implementing a display protocol known as ICA-3 as well as multi-user capabilities.

The terminal includes, in an exemplary embodiment, a hardware architecture based on the Intel X86 processor line. In addition, the terminal offers only limited main memory, and is generally incapable of local execution of modern application programs such as word processing, graphics, database, or other popular programs, or even the Windows or DOS operating system itself. In this way the terminal of the present invention is distinctly different from prior art X terminals or diskless PCS, or other PCS configured in a client/server environment.

Importantly, the hardware architecture does not implement the conventional IBM PC/AT bus, and the firmware within the terminal implements neither standard PC/AT BIOS nor a standard PC-compatible disk operating system. The terminal firmware implements network access extensions compatible with the application server, again, for example, the ICA-3 extensions available from Citrix Systems. A high resolution graphical display is provided both for ease of use and may be either monochrome (including grayscale) or color, as well as input/output devices typical of the Windows environment such as mouse, keyboard, touch-screen and other I/O services.

In additional, the terminal includes a network interface capable of communicating with the application server across conventional RS232 lines, Ethernet connections, wireless, ISDN, fiber optic, AC power-line modems, cable or other connections. When connected to the application server, the terminal displays the Windows NT or Windows 95 operating environment, including any application programs executing on the server and accessed by the user of the terminal. In the exemplary arrangement, the terminal appears to the user essentially the same as a much more expensive, less secure, harder to manage personal computer. As a result, during operation the terminal of the present invention offers numerous features normally associated with a multiuser system, while at the same time offering many of the desirable features typical of a client/server environment.

One feature of the present invention is the availability of client-independent computing within a Windows environment. Thus, with a system according to the present invention, a user defines his operating environment and that environment follows him or her throughout the system. A user could therefore log onto one terminal, define an environment, and then log onto another terminal. That second terminal would automatically display the environment defined by that user at the first terminal.

In addition to the ability to display application program information, the terminal of the present invention includes a setup mode which permits the user to configure a variety of operating aspects of the terminal.

To enable terminals of the present invention to comply with commands sent by servers such as those running WinFrame, a special purpose terminal operating system has been developed which either emulates or otherwise responds to the calls to a conventional PC operating system. The terminal operating system includes a boot block to initialize and start the system, followed by a kernel which loads additional drivers and command software, including loading modified WinFrame client code. Execution of the modified WinFrame client includes making a connection to an applications server.

In addition to the ability to display applications display information in a Microsoft Windows environment, the present invention also includes the ability to communicate with other servers or hosts running "non-Windows" operating systems by the inclusion of other resident terminal emulations or personalities, with the ability to "hot key" switch among the various personalities.

Another feature of the present invention is the implementation of a graphical user interface for configuration of a terminal and other locally managed tasks. In particular, the graphical interface employs a plurality of windows and each window permits reconfiguration of one or more terminal characteristics or other local tasks. Arranged in groups within each window are the selects which can be configured within that window. These selects, or choices, from which the user may select are displayed, or displayable through a pull-down or similar menu. Various data structures are associated with differing types of groups and selects.

A further feature of the present invention is the inclusion of the terminal operating system in flash memory. The flash memory may be updated through a variety of methods, including communication through a suitable interface such as a parallel port, a serial port, or a network adapter when the terminal is placed in a predetermined state.

It is therefore one object of the present invention to provide a terminal capable of displaying information generated by an application server executing popular applications programs running within the Microsoft Windows® NT operating environment.

It is a further object of the present invention to provide a terminal configuration system having a graphical user interface for configuring the terminal operating parameters.

It is a still further object of the present invention to provide a terminal for display of applications program information which emulates a client personal computer in a client-server networking environment.

It is a still further object of the present invention to provide a terminal having a combination of desirable features normally associated with a multi-user computing environment together with desirable features normally associated with a client-server environment.

It is a further object of the present invention to provide a terminal operating system which enables communications with a windowing operating environment while at the same time running a non-standard PC/AT BIOS and non-standard PC DOS.

It is a still further object of the present invention to provide an apparatus and method for rapid, convenient updating of the terminal operating system.

It is yet another object of the present invention to provide multiple resident personalities for a terminal, with rapid switching among the various personalities without the need to change expansion cards or remove power from the terminal.

These and other objects of the present invention may be better appreciated from the following Detailed Description of the Invention taken in combination with the accompanying Figures.

THE FIGURES

Figure 1:
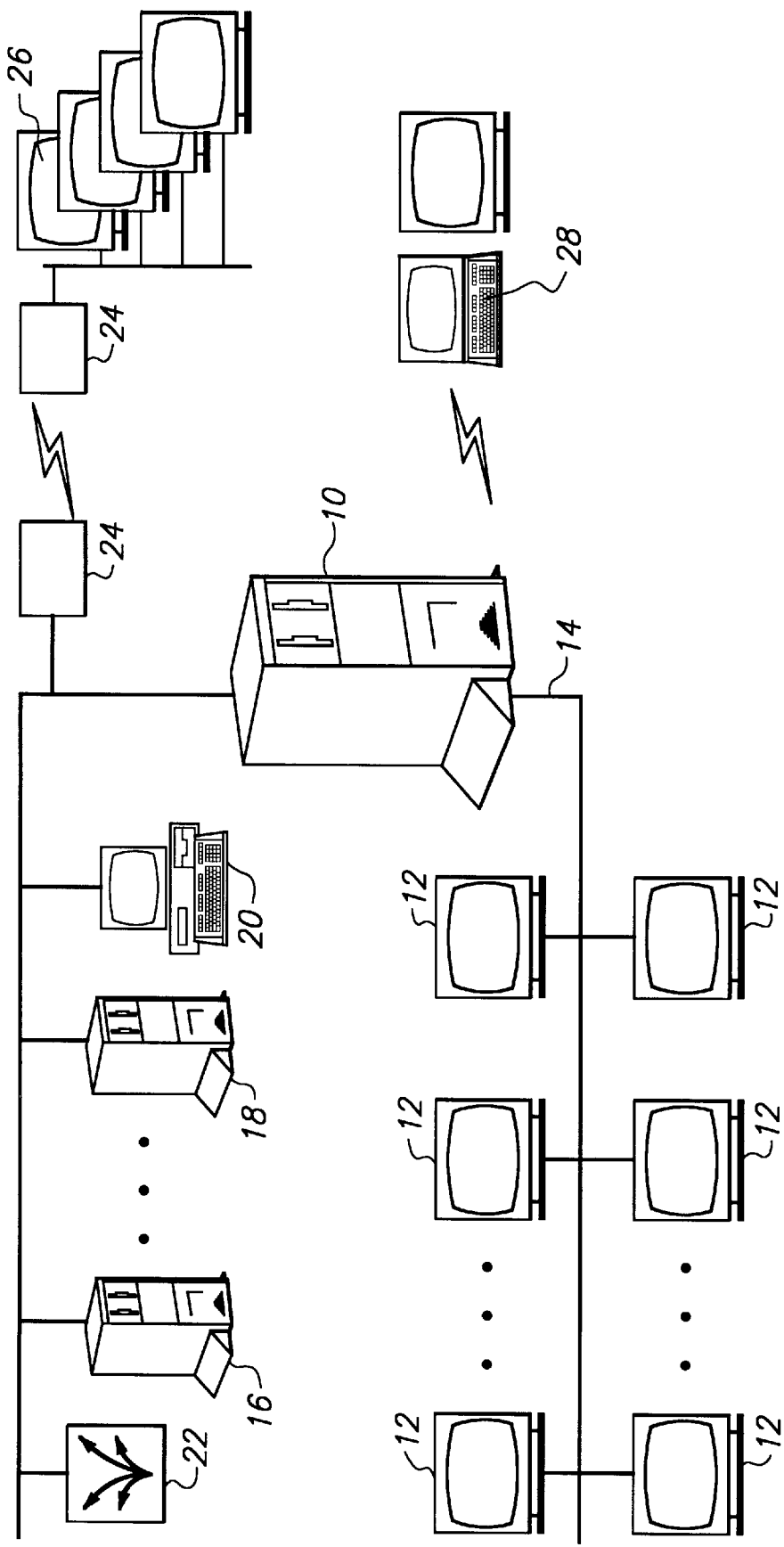
FIG. 1 shows a generalized arrangement of an application server and a terminal in accordance with the present invention.
Figure 3:
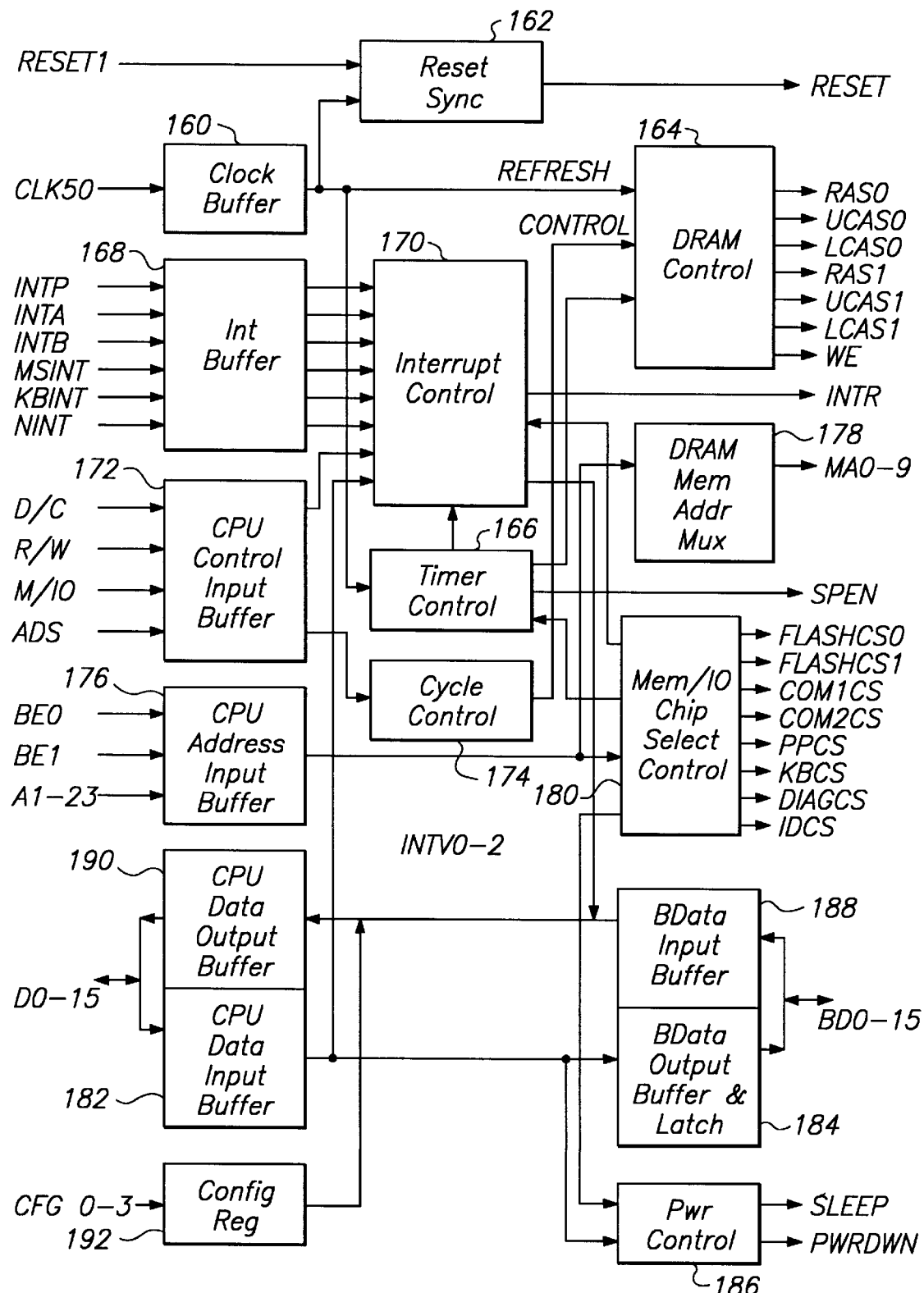
FIG. 3 shows in block diagram form the architecture of the control ASIC of FIG. 2.

FIGS. 7B1–7B3 show the data structures associated with the configuration software of the present invention.

DETAILED DESCRIPTION OF THE INVENTION

Referring now to FIG. 1, a simplified system is shown in accordance with the present invention. In particular, a single application server 10 communicates bidirectionally with one or a plurality of terminals 12 over a suitable network or other communications link 14. The network link may be an RS232 line, an AC power line modem, or an Ethernet connection such as twisted pair or coaxial cable, or other suitable link such as fiber optics. In a exemplary arrangement which has been determined to operate satisfactorily, the application server is running an operating system such as Windows NT® with appropriate extensions, such as those offered by Citrix as the Winframe OS. The Citrix remote windows protocol or extensions include the ICA 3.0 protocol as well as enhancements which provide true multiuser capability within the Windows NT environment. For such a configuration, the application server may be, for example, a personal computer based on an Intel Pentium or '486 processor or other similar processors such as a DEC Alpha or a MIPS processor, or multiple processors, together with a suitable amount of RAM. In an exemplary configuration, the server may have sixteen megabytes of RAM for Winframe™ OS, plus 1–8 megabytes of RAM per concurrent user, depending on the particular application being run by the user.

In appropriate configurations, the application server 10 may also communicate with other servers, including a NetWare file server 16, a Unix host 18, other personal computers 20, or an Internet gateway 22. Also, through other connections such as a router or other communications server 24, the application server 10 may also communicate with remote terminals 26, or by other means to remote dial-up users 28.

Figure 2:
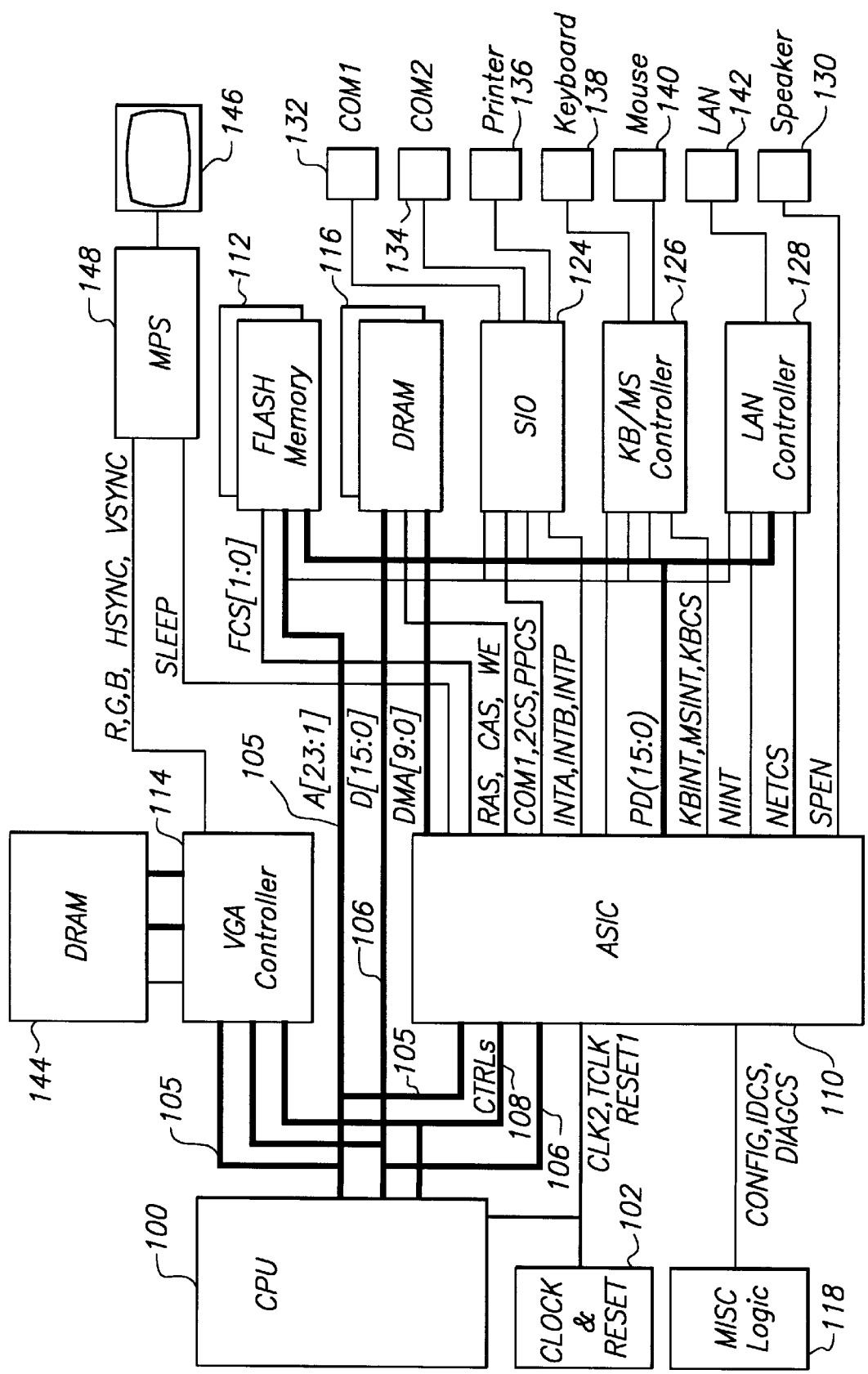
FIG. 2 shows in functional block diagram form the architecture of the logic of the present invention.

Referring next to FIG. 2, the hardware architecture of a terminal in accordance with the present invention may be better appreciated. In particular, a CPU 100, typically a microprocessor of the X86 family and in an exemplary embodiment an 80386CXSA or '486SXLC microprocessor, receives clock and reset signals from clock and reset logic 102. The CPU communicates with the remaining logic via an address bus 105, a data bus 106 and a CTRL bus 108. Importantly, the buses 105, 106 and 108 are typically not compatible with the IBM PC/AT standard, nor any other personal computer standard, since the present invention is intended to avoid many, if not all, of the pitfalls associated with personal computers operating in a networked environment.

In particular, the address bus 105 extends from the CPU 100 to a control ASIC 110, as well as a flash memory array 112 and a VGA controller 114. The data bus 106 likewise communicates with the control ASIC 110, the VGA controller 114, and a memory array 116. The CTRL bus 108 similarly provides control signals to the ASIC 110 and the VGA controller 114. Miscellaneous logic 118 provides CONFIG, IDCS and DIAGCS to the ASIC 110.

The ASIC 110 communicates with the memory array 116 via a DMA bus 120, and also communicates with the flash memory 112 via a PD bus 122. The PD bus 122 also provides communication between the ASIC 110 and the flash memory 112, a serial I/O and parallel controller 124, a keyboard and mouse controller 126, as well as a LAN controller 128. In addition, the ASIC provides an FCS signal to the flash memory 112, provides RAS, CAS and WE signals to the memory array 116, and provides COM1, COM2, and PPCS signals to the SIO controller 124. Further, the ASIC 110 provides a KBCS signal to the keyboard/mouse controller 126, and provides an NETCS signal to the LAN controller 128. Finally, the ASIC provides a speaker enable signal SPEN to a speaker 130.

The CPU 100 also communicates with the SIO controller 124, the keyboard/mouse controller 126, and the LAN controller 128 via a portion of the bus 105. In addition, the ASIC 110 provides hardware interrupts INTA, INTB and INTP to the SIO controller, provides hardware interrupts KBINT and MSINT to the KB/MS controller 126, and provides hardware interrupt NINT to the LAN controller 128.

The memory array 116 is typically comprised of DRAM memory, although other types of memory may be acceptable in some embodiments. However, unlike modern personal computers, the amount of DRAM in the array 116 required for operation of the terminal typically will be within the range of 512 KB to four megabytes. In an exemplary embodiment, only 23 memory address lines and a byte select line are used, which limits the memory space to 16 MB. In other embodiments different sizes of memory space may be preferred.

The Control ASIC 110, in an exemplary embodiment, contains functional blocks for bus control, DRAM control (typical fast page mode with interleave), a system timer and speaker timer, and an I/O controller. The Control ASIC may also be implemented as a gate array or other highly integrated device, and is described in greater detail in connection with FIG. 3.

In an operating example, it has been shown sufficient to size the flash memory 112 on the order of 512 KB; however, in other applications a size of up to five megabytes or more may be preferred. While in a preferred embodiment the array 112 comprises flash memory, in some embodiments a substantial functionality of the present invention would remain even if the array was of EPROM and SRAM or other comparable memory devices.

The SIO controller 124 communicates with COM1, COM2 and printer (or parallel) ports 132, 134 and 136, respectively. The SIO/parallel controller 124 may be a 16552 device, such as that available from Startech. The keyboard/mouse controller 126 similarly communicates with a keyboard 138 and mouse 140, while the LAN controller, which need not be provided in all embodiments, communicates with a LAN interface 142. In one exemplary prototype, the keyboard/mouse controller 126 may be a standard keyboard controller, while the keyboard and mouse will both comply with the PS/2 standard, although in at least some embodiments the keyboard controller will be modified to be compatible with the four-wire keyboard interface described in U.S. Pat. No. 4,706,068. Finally the LAN controller may be any suitable network interface controller, and may comply with any accepted network standard, including 10BaseT, 10Base2, and others. The network interface may have 512 KB memory or more for additional code storage.

The video and graphics controller 114 has operatively associated therewith a second memory array 144 for storing video and graphics information, which is supplied to a monitor 146 via an MPS 148. The video controller 114 may be, for example, a Cirrus 5429 device with internal RAMDAC, and may have on the order of one megabyte of video memory to provide high resolution graphics displays compatible with, as an example, at least the Video Graphics Array standard. It will be apparent to those skilled in the art that the total memory requirements are distinctly less than for a personal computer having similar capabilities to display Windows application programs. A sleep signal 150 may be provided from the ASIC 110. Various methods for implementing a sleep signal may be used. For example, in a monochrome version of the present invention, a signal is provided to the power supply of the monitor, which disables the video signal and lowers the power required of the monitor power supply. In a color version, the sync signals are manipulated in accordance with the VESA standard to cause the monitor to power down. It will be apparent to those skilled in the art that, in the future, numerous of these functions, including the CPU, may be incorporated into one or more VLSI devices such as ASICs, gate arrays, or other devices.

In a special feature of the hardware of the present invention, the terminal operating system stored in the flash memory 112 may be updated through a variety of methods, including communication through a suitable interface such as the parallel port 136, a serial port 132 or 134, or a network adapter such as LAN interface 142. In an exemplary embodiment, the flash memory may be updated through communication with a host system when the terminal is placed in a predetermined state, such as by attaching a loopback plug, an appropriate key sequence or other suitable means. In such an arrangement, downloading to the terminal's memory system is enabled while still permitting communication with the host. The host then provides, via the communications link, updated operating characteristics either to the terminal's DRAM 116 or the flash memory 112 directly. Thereafter, the updated operating system information is stored in the flash memory 112 if necessary, and the terminal is returned a normal operating status in which downloading is disabled.

In normal conditions, the system of FIG. 2 begins operation following a reset by beginning execution of the boot code contained in the flash memory array 112. The flash memory array 112 may be arranged in two banks, both of which are accessed at a predetermined address of the CPU memory space, for example C00000–DFFFFF and E00000–FFFFFF, while the remainder of the memory space is allocated to provide many of the normal PC functions as shown in Table 1, below. It will be apparent to those skilled in the art that, in an exemplary embodiment, the video/graphics memory addresses are shifted eight megabytes beyond conventional PC memory addresses. In such an embodiment, the VGA chip may be used in "compatible" mode (i.e., linear addressing mode turned off), so the VGA chip only responds to a frame buffer at A0000h–AFFFFh (in graphics mode) or B0000h–B7FFFh (for MGA mode) or B8000h–B8FFFh (for CGA mode), and that these addresses will be shifted to 8A0000h–8AFFFFh, and so on. The addresses have been shifted to permit Bank 0 DRAM to be contiguous, while at the same time (and as discussed hereinafter) permitting emulation of normal PC functions sufficient to permit display of Windows application program information.

TABLE 1

| | |
|---|---|
| FLASH BANK 0 | FFFFFF |
| Boot Block Flash | E00000 |
| FLASH BANK 1 | DFFFFF |
| File System Flash | C00000 |
| Network | BFFFFF |
| Card | B80000 |
| Additional Flash | B7FFFF |
| Memory | B00000 |
| Video/Graphics | AFFFFF |
| Controller | 800000 |
| DRAM | 7FFFFF |
| BANK 1 | 400000 |
| DRAM | 3FFFFF |
| BANK 0 | 000000 |

Bank 0 may be arranged into a 16K byte boot block at the upper address range, for example FFC000H–FFFFFFH, following two eight Kbyte parameter blocks, and further following a plurality of main blocks down to address F80000H (for a 512 KByte allocation) or down to F00000H (if a one megabyte allocation is made) or E00000H (if a two megabyte allocation is made). The main blocks of memory are typically organized as a file system. Bank 1 of the flash memory is typically allocated to a file system device, and may range from address DFFFFFH down to C00000H.

Referring next to FIG. 3, the ASIC 110 may be better appreciated. A clock buffer 160 receives a CLK50 signal, and provides clock signals to RESET SYNC logic 162, DRAM control logic 164, and timer control logic 166. An (INT) buffer 168 receives INTP, INTA, INTB, MSINT, KBINT and NINT signals as set forth in Table 2. The INT buffer provides a plurality of signals to Interrupt Control logic 170, which receives a control signal from CPU Control input buffer 172 and a timer control signal from timer control logic 166 and generates an INTR output signal, which is provided to the CPU. The CPU Control input buffer 172 also supplies a control signal to Cycle control logic 174, which in turn provides a control signal to DRAM control 164. The DRAM control 164 also receives a refresh signal from timer control logic 166; the timer control logic 166 also generates the speaker enable signal SPEN.

In the exemplary embodiment, the interrupt control logic 170 is not 8259 compatible; likewise, the system timer, or timer control logic 166, is not 8254 compatible, and operates at a higher frequency than an 8254-compatible device. The result is that some of the higher frequency interrupts sent by the timer control logic are masked in the kernel, but others are passed through to approximate, on average, the normal time between interrupts. The higher frequency thus permits emulation of standard PC functionality even though the time between lower (standard) frequency emulated interrupts may not be uniform.

The ASIC 110 also includes a CPU Address Input buffer 176, which receives BE0, BE1 and A1–A23 signals as described in Table 2 and provides an output signal to a DRAM Memory Address Mux 178 as well as Mem/IO Chip Select Control logic 180. The Mem/IO Chip Select Control logic 180 provides a variety of output signals, including FLASHCS0 (FCS0) and FLASHCS1 (FCS1) signals, and others as shown in Table 2. Further, the ASIC 110 receives signals D0–15 from the data bus 106 and provides them to CPU Data input buffer 182. The buffer 182 provides data to a Bdata Output Buffer & Latch 184, which supplies output signals BD0–15. The buffer 182 also provides data to Power control logic 186, which supplies SLEEP and PWRDWN signals.

The signals BD0–15 can also provide data to Bdata Input Buffer 188, which in turn supplies that data to CPU Data output buffer 190. The interrupt control logic 170 also provides signals to the buffer 190. A configuration register 192 also provides a configuration signal (such as hardware configuration, for example how much flash and/or DRAM, or from the monitor power supply or from a plug-in card, for example, a network card) to the CPU data output buffer, which can supply data on the bus 106 to the CPU.

Figure 4:
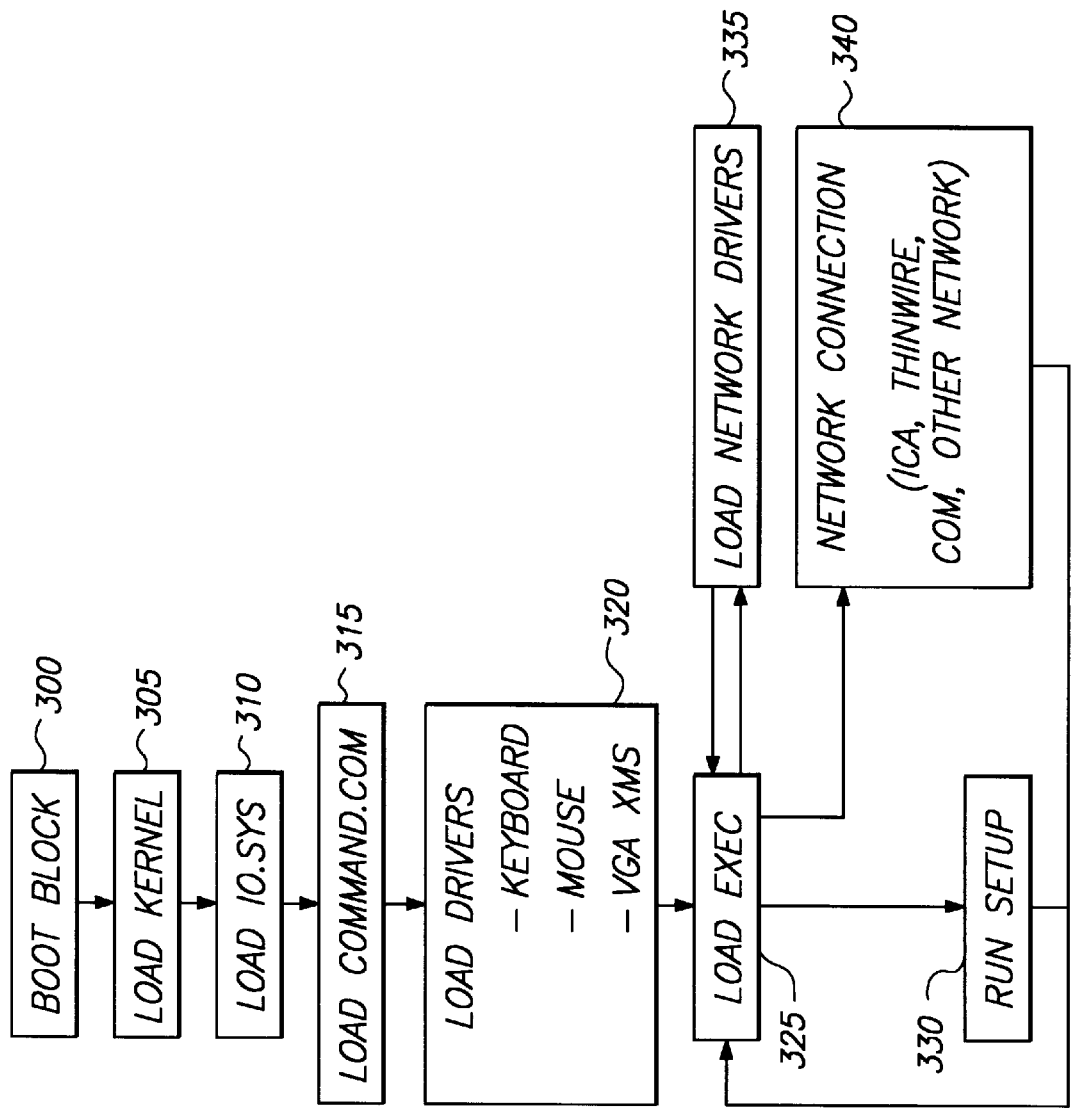
FIG. 4 shows an overview of the software architecture of a terminal in accordance with the present invention.

Referring next to FIG. 4, the key elements of the terminal operating system of the current invention may be better understood. It will be appreciated from the foregoing that the hardware of the present invention is not compatible with a standard AT-bus design. Instead, the present invention relies on firmware to provide the requisite BIOS services to the upper software layers. In an exemplary embodiment, the firmware is designed to run in virtual 8086 mode, with AT-compatible hardware components such as the interrupt controllers and timers being emulated in software as closely as possible. In addition, while a standard keyboard controller is used in an exemplary embodiment, in the event a non-standard controller is used the interface to such a device would also be emulated. Signals such as I/O from and to the ports of such hardware components are intercepted to facilitate the emulation. Also, under the control of an emulated A20 gate, the memory management features of the processor could be enabled to simulate the wraparound which occurs in normal hardware at one megabyte.

Continuing with reference to FIG. 4, the terminal operating system begins execution with a boot block 300, followed by loading of a kernel 305. The kernel 305 provides many of the intercepting and remapping functions of the present invention, as more particularly explained hereinafter. Upon completion of the kernel 305, the IO.SYS code 310 is loaded. Next the COMMAND.COM code 315 is loaded, followed by executing commands provided by an AUTOEXEC.BAT file. The AUTOEXEC.BAT file may include, for example, keyboard and mouse drivers although both such drivers may not be used in every instance, as well as a VGA XMS driver. It may also include other optional code, including starting a self-test sequence, which executes if appropriate conditions exist. In an exemplary embodiment, a loopback plug installed in a communications port causes the self-test sequence to execute.

The EXEC.COM code 325 is then loaded. At this point, depending on the implementation, either the system will enter setup mode, or user commands may cause either an entry of the setup mode or the loading of network connection code. In a presently implemented embodiment, the system enters the setup mode to obtain current configuration data, and then continues with loading of the network connection code.

If the implementation permits the user to select, and if the setup mode is selected by the user, the EXEC.COM 325 branches to run the SETUP, or GUI 330. If the setup mode was not selected, the EXEC.COM 325 cooperates in the loading and unloading of network drivers at 335 and begins the running of network connection code (again, ICA, thinwire, corm, or other network) at 340. In a presently preferred embodiment, the network connection code includes a substantially modified version of the Winframe for DOS client, the standard version of which is available from Citrix Systems, Inc.

Figure 5:
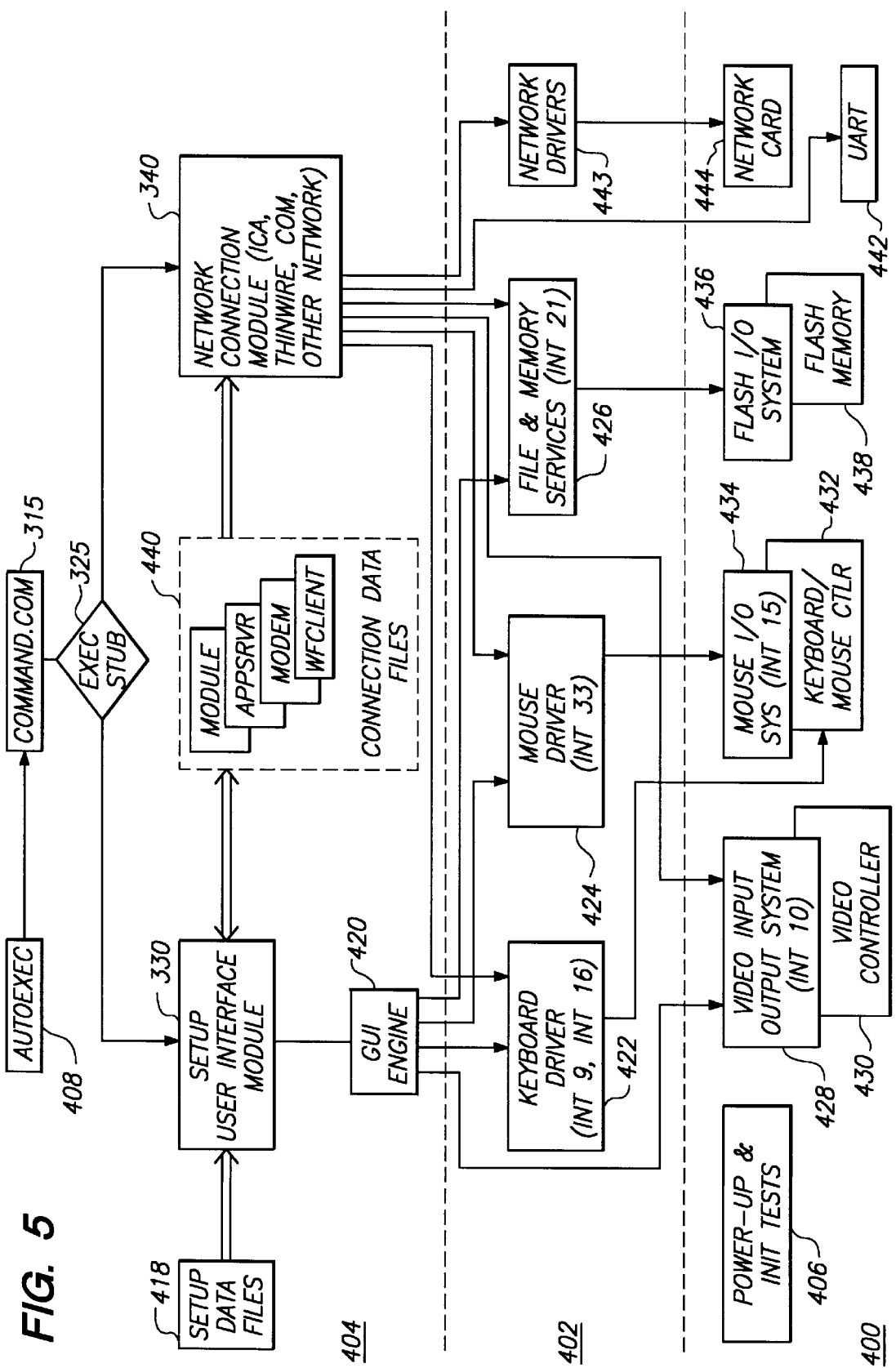
FIG. 5 shows in simplified block diagram form the setup interface between the GUI Engine and the remainder of the system.

Now referring to FIG. 5, the cooperation of the terminal operating system and the hardware architecture of the present invention may be better appreciated. In particular, the lowest layer shown in FIG. 5 is the Input/output system and hardware layer 400. The next higher layer is the Driver layer 402, while the top layer is the Application layer 404.

At power-on, the power-up and Init tests 406 in the hardware layer are performed as part of the boot block 300. The power-up and Init tests 406 execute partly out of the flash memory system 112 and partly out of RAM 116. Once the power on self tests are completed, the terminal continues with the boot sequence described generally above in connection with FIG. 4, including the remainder of the boot block 300, an AUTOEXEC sequence 408, and the COMMAND.COM sequence indicated at 315. Both the AUTOEXEC and COMMAND.COM files are maintained in the flash memory.

After the terminal's COMMAND.COM sequence executes, it causes the AUTOEXEC file to load. The AUTOEXEC in turn causes the EXEC.COM 325 to load. As noted above, the EXEC.COM sequence 325 can branch either to the Setup Module 330 or the Network Connection module 340. At initial installation or any time thereafter that operating parameters of the terminal require verification or changing, the Setup Module 330 is run. The Setup Module 330 receives information from one or more setup data files 418 and starts the GUI engine 420. The GUI engine 420 in turn communicates with a keyboard driver 422, mouse driver 424, and the files and memory services driver 426 of the terminal operating system. In addition, the GUI engine 420 also communicates with the video Input/output system 428, which in turn provides data to the video controller 430, which may for example be based on a Cirrus 5429 graphics processor, to generate a video display during the setup sequence. The setup sequence will be described in greater detail in connection with FIG. 5.

The keyboard driver 422 in turn communicates with the keyboard controller hardware 432, which may, for example, be a conventional PS/2 keyboard Input/output system, a universal serial bus (USB) interface, and in at least some embodiments may also include a four wire keyboard interface such as that described in the aforementioned U.S. Pat. No. 4,706,068. Likewise, the mouse driver 424 is typically also communicating at appropriate times with a mouse Input/output system 434. Throughout such operations, the terminal operating system's flash file and memory services portions 426 will typically be executing out of flash and RAM.

As discussed in greater detail in connection with FIG. 5, the setup process permits the user to specify the configuration information of the terminal, including such parameters as network interface and related configuration details, language, colors, and other parameters. Once these parameters are specified, the data is stored in the connection data files 440.

At this point the user is ready to exit the terminal setup module 414, and return to the EXEC.COM. When allowed to continue, the EXEC.COM process 412 can be caused to branch to the network connection module 416. The network connection module 340 initiates by retrieving the data stored in the connection data files 440 and the command line of the connection module, thereby communicating to the application server how to talk to the rest of the driver and hardware layers of the terminal. In particular, the network connection module communicates with the keyboard driver 422, the mouse driver 424, the video input/output system 428, and the file and memory services portion 426 of the terminal operating system. In addition, the network connection module also connects a hardware serial interface 442 as well as, in some embodiments, a hardware network interface 444. The network drivers 444 execute out of RAM 116 in one exemplary embodiment, but may execute out of flash memory 112. The serial interface 442 may be a conventional RS232 interface, but may also be another form of serial connection, such as the Universal Serial Bus, or USB.

Figure 6:
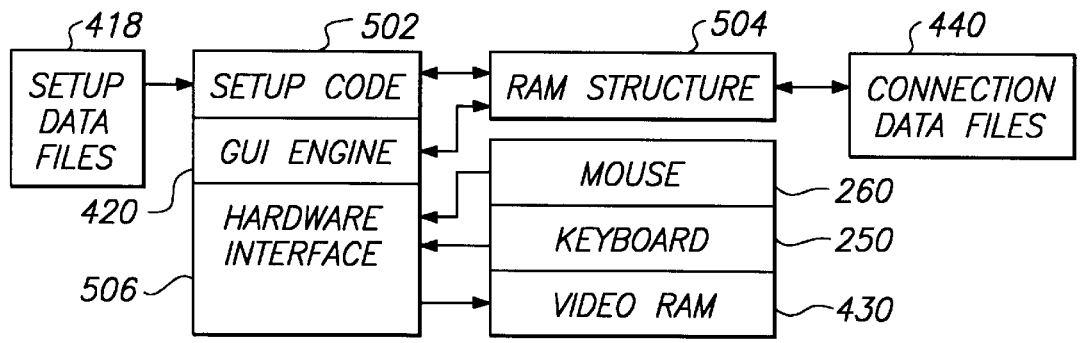
FIG. 6 shows in flow chart form a top level view of the process by which the terminal of the present invention connects to an application server.

Referring next to FIG. 6, the operation of the GUI engine 420 shown in FIG. 5 during setup module of the terminal 12 may be better appreciated. The GUI engine operates only during the setup mode, and provides a rudimentary graphical user interface during the configuration operation.

As noted in connection with FIG. 5, above, the operation of FIG. 6 begins when the setup sequence is invoked during terminal boot up. The setup sequence may be invoked from a sequence of keystrokes or any other convenient and suitable means. The setup sequence starts by calling setup code 502, which in turn pulls information from setup data files 418. The setup data files 418 identify the options available in the configuration of the terminal. The setup code 502 communicates bidirectionally with a RAM structure 504, and also causes existing connection information from the connection data files 440 to be written into the RAM structure 504. The GUI engine 420 also communicates bidirectionally with the RAM structure to set up and display current information in an arrangement described hereinafter as areas, groups and selects. In addition, a hardware interface 506 provides video information to video controller 430 while responding to information received from the user via the mouse 260 and keyboard 250.

Figure 7A:
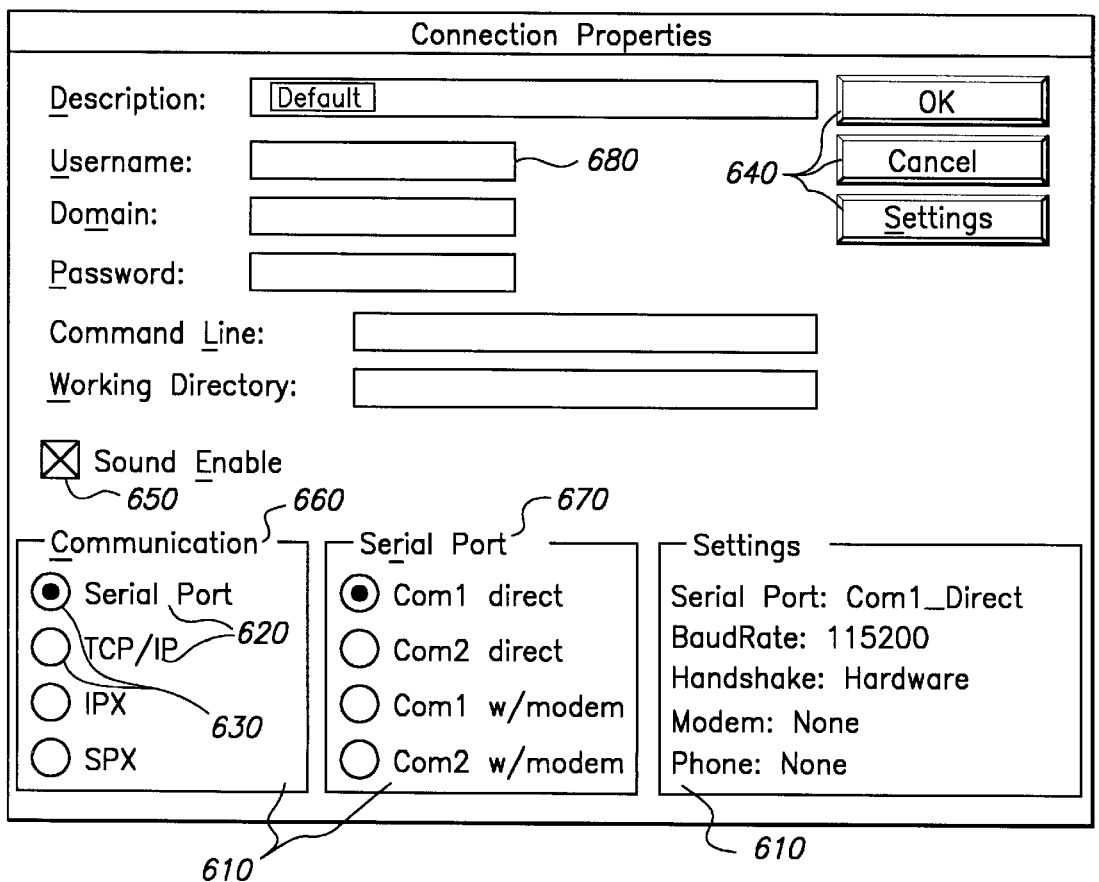
FIG. 7A shows a setup screen from the configuration software of the present invention.

The setup code permits the user to cycle through a plurality of configuration menus for the operating characteristics of the terminal, such as the language displayed on the terminal, the network connection method, and so on. Shown in FIG. 7A is an illustration of a setup screen used in the configuration mode of the terminal. In a preferred embodiment, the setup screens are displayed graphically. As the user cycles through the configuration screens, the configuration data may be selectively updated by the user through use of the keyboard and mouse. The updated data is maintained in the RAM structure 504 before being written to the connection data files 436. However, in a presently preferred embodiment, certain of the data may be updated dynamically, while other data is not updated until the setup sequence is completed. Upon completion of the setup sequence, including writing any remaining configuration data to the connection data files 436, the setup sequence exits and returns to the EXEC.COM 325 for initiation of the network connection module 340 shown in FIG. 5.

Continuing with reference to FIG. 7A, the overall window in which the data appears will be referred to herein as an area 600. Within each area 600 are one or more groups 610, and each group 610 comprises one or more selects 620. Thus, in the example of FIG. 7A, the "Communication" group includes the selects Serial Port, TCP/IP, SPX and IPX, each of which has associated therewith a region 630 indicating that that select has been chosen, or selected.

Referring next to FIGS. 7B1–7B3, the data structures associated with the configuration software are shown. In particular, a list of area pointers is found in AREA_LIST 700. The structures pointed to by the area list include boundaries, size, title and groups attached for all areas as defined by the SETUP process. As noted previously, each area appears as a window on the screen. In addition, all areas which are currently being displayed are listed in DISP_AREA_LIST 702. In an exemplary embodiment, the first area listed is displayed as the bottom area, and the last area listed is the top area displayed In the exemplary embodiment, overlapping of windows is permitted although overlapping is not necessarily required in all embodiments.

At 704 is the data structure for GROUP_LIST, which lists all groups defined by the SETUP process in all areas found in the AREA_LIST 700. As previously noted, each area typically includes one or more groups. An optional data structure 706 for a STRING_LIST may also be provided, and a FILE_LIST 708 is provided as a directory to bitmap images which may be used in multiple instances within the various areas, groups and selects.

The structure of the AREA_LIST 700 can be seen at 710 to include a block for an area ID 712, a pointer to the next area 714, a pointer to the previous area 716, and a structure pointer 718. The structure pointer 718 associated with each area ID 712 points to an area structure 715 which includes the area ID 712 together with an ABS_X entry 720 and an ABS_Y entry 722 to give the location of that area relative to (in an exemplary embodiment) the top left corner of the display. The area structure 714 also includes a ROWS entry 724 and a COLUMNS entry 726 that together specify the size of the area. A FLAGS entry 728 specifies whether a border extends around the area. A TITLE_POSITION entry 730 and TITLE_BAR entry 732 specifies the text of the title and its location within the title bar of the particular area, while a MAX_STR_LEN entry 734 specifies the maximum number of characters which may be used for the title.

In addition, the area structure 714 also includes an entry 736 for the number of groups contained within the particular area. An AREA_MPTR entry 738 specifies the mouse pointer hot spot within the area, while an entry DEF_BUTTON 740 specifies which button within the area will be the default. The default button will be activated when the "enter" key is pressed. A CAN_BUTTON entry 742 specifies the cancel button, which will be activated when the "esc" key is pressed. Finally, a list of pointers, one for each group associated with the area, is specified at 744A–744N. Each group pointer 744 points to an associated group structure block 746, discussed hereinafter. A hot key list may also be defined for the area.

The structure of the DISP_AREA_LIST, shown at 748, is essentially identical to the structure of the AREA_LIST 700, and includes blocks for area ID, next area, previous area, and structure pointer. As with the AREA_LIST 700, the DISP_AREA_LIST 748 also points to the area structure 714. A similar structure for the GROUP_LIST 704 is shown at 750, and includes a group ID 752, a next group pointer 754, a previous group pointer 756 and a group structure pointer 758. A similar structure for the optional STRING_LIST 706 may also be provided, and may include a string ID 760, a next string pointer 762, a previous string pointer 764, and a string structure pointer 766.

Referring again to the group structure pointer 758, it points to the group structure block 746 and includes the group ID 752, a PARENT_SELECT_ID entry 780, to identify the select which, when activated, will automatically pop up this group, a HOTSPOT_COUNT entry 782 to identify the number of mouse hot spots within the group, and GSTART_X and GSTART_Y entries 784 and 786, respectively, to specify the relative location of the group within the area. In an exemplary embodiment, both the group and the select locations are specified relative to the top left corner of the area containing them; but other relationships may be defined that are also acceptable, such as specifying the location of a select relative to the location of its group. The most important element is to ensure that all features of an area maintain their position within the area if the area is moved.

The group structure block 746 also includes ROWS and COLUMNS entries 788 and 790, respectively, for specifying the size of the group, as well a GFLAGS entry 792 for specifying the border of the group. In addition, a QUICK_KEY_POSITION entry 794 and a QUICK_KEY_STROKES entry 796 may also be specified for "hot" keystroke combinations associated with the group.

Further, and similar to the area structure, entries for title position 798, group label 800 and MAX_STR_LEN 802 may be provided. In addition, a NUM_OF_SELECTS entry 804 is provided to identify the number of selects contained within a group. Next, an entry 806 for AID_ATTACH is provided as a back reference to the area ID 712 with which the particular group is associated. The AID_ATTACH entry 806 is not required in all cases, but assists in improving performance in at least some instances. Lastly, a list of pointer entries 808A through 808N each point to a select structure associated with the particular group. As will be discussed hereinafter, a variety of select structures may be associated with each group, but some elements are common among the various types. Thus, the first pointer 808A points to a SELECT_COMMON structure block 810. Referring again to the area structure block 714, the default button entry 740 and cancel button entry 742 also point to the select common structure block 810.

The SELECT_COMMON structure block 810 includes a select ID entry 812, an entry 814 giving back reference to the group ID, REL_X and REL_Y entries 816 and 818 together with ROWS and COLS entries 820 and 822 for specifying the location and size of the select, QUICK_KEY_POS and QUICK_KEY_CHR entries 824 and 826 for specifying the hot keystroke combinations associated with the select, a MAX_STR_LEN 828 and select string 830 for specifying the maximum size and title for the select, and an SFLAGS entry 832 for specifying the characteristics of the select.

In addition, a SELECT_TYPE entry 834 is also provided. As noted previously, different types of selects are available, and reference is again made to FIG. 7A. The different types of selects which may be provided within a group depend on the type of data required at that step for configuring the terminal. In some instances, the choices involve only the pressing of a button (see buttons 640); in others, a select involves enabling or disabling a feature, as a check box (see 650 in FIG. 7A); in others, one of several choices must be selected, as indicated in the "Communication" and "Serial Port" groups 660 and 670 of FIG. 7A. In still others, an image may be selected, while in others specific text must be selected. In some, a fill-in entry is required (680 in FIG. 7A), while in others one of many fields must be filled in. Although these are the types of selects which have been implemented in an exemplary embodiment, the list is not exhaustive and other selects can be readily implemented given the teachings herein.

For a "fill in" select, cursor start and cursor end entries 836 and 838 are provided, together with a "first displayed"

entry 840 for identifying from which character on the string should be displayed. In addition, a LABEL_REL_X entry 842 is provided as well as a LABEL_REL_Y entry 844 and a LABEL_STR entry 846.

For a "one of many" select type, entries for NUM_OF_SEL_ROWS and NUM_OF_SEL_COLS 848 and 850, respectively, are provided. Entries are also provided for the number of options 852 and default option 854, as well as a quick key pointer 856 and a flag pointer 858 to identify the number of option which are active. Finally, a select size 860 is also provided.

For an "image" type of select, only an entry for the file ID 708 and an image pointer 862 must be specified.

For a "fields" type of select, a "child group" ID entry 864 is provided together with a child group pointer, which points to a group structure of the type shown in group structure block 746. The child group will be popped up automatically when the parent select is activated, and one of a group of fields is selected.

For a "list of strings" select, entries are provided for number of options 868, the maximum length of the option title (or MAX_OP_LEN) 870, a horizontal display offset entry 872 and a vertical display offset entry 874, together with an X label position 878 and Y label position 880. Finally a label string 882 and a select string size entry 884 are provided.

Referring again to the AREA_MPTR entry 738, the mouse pointer hot spot is specified by a structure which includes an area ID entry 900, a group IDentry 902, and a select ID 904. In addition, an option select type 906 is provided to specify the type of select with which a particular hot spot is associated. Further, back reference entries 908 and 910 are provided for the group ID within the area, and the select ID within the group. Still further, four entries 912A–D specify upper left X and Y positions as well as lower right X and Y positions for the mouse hot spot, together with an entry 914 for mouse flags which cause the mouse hot spot to be activated when the proper menu is displayed. In addition to the hot spots described in the foregoing, additional hot spots are provided at the top and bottom of a list display, to allow scrolling, and in the title bar portion of an area, to permit the area window to be moved.

In addition to the foregoing structures, a data structure is also provided for maintaining the currently selected entries from among the various choices. The current data structure block is shown at 950, and includes an entry 952 for the number of areas currently defined by SETUP; an entry 954 for how many image files are defined; entries 956 and 958, respectively, for how many groups and selects have been defined, an entry 960 for allocating a predetermined maximum number of selects. In an exemplary embodiment, the maximum number of selects is allocated in blocks of ten.

Additional entries 962 and 964 are provided for the number of pixels per column and row, respectively, as well as a font entry 966, an area focus entry 968, a group focus entry 970, and a string focus entry 972. Also, a mouse focus entry 974 is provided for specifying the hot spot. Further, OFOCUS and TFOCUS entries 976 and 978 may be provided for specifying select options and select types with keyboard focus. Still further, IFOCUS and JFOCUS entries 980 and 982 are provided for the hotspot entries 908 and 910 from the mouse structure block described above. Finally, a menu entry 986 is specified for identifying the current menu focus, together with entries 988 and 990 for defining area borders and group borders, together with an OFLAGS entry for specifying mouse modes.

The information specifying the current state of the selects is specified in an ACTIVE SELECT structure 1000. Each structure includes a button entry 1002, an STFLAGS, or select common flags, entry 1004, and an ACTIVE entry, which stores the current state of all selects, from which that data may be made available to the SETUP code.

In an exemplary embodiment, an event queue structure 1010 may also be supplied, for recording keyboard strokes and mouse movements in an event queue.

As noted previously, a key feature of the present invention is that the terminal operating system of the present invention is not compatible with a standard PC/AT BIOS or DOS. However, the terminal operating system is required to support certain of these functions to maintain the ability to display application data in a multiuser environment, such as by interfacing to a Citrix client or other supported emulations. Attached as Tables 3A–3C is a list of the standard IO.SYS and BIOS.SYS functions which are supported by the present invention; it will be apparent to those skilled in the art that the list does not include numerous standard BIOS and DOS functions. Other functions are unsupported. In addition, some of the features which are listed are only partly supported in a presently preferred embodiment. Thus, Function 36$h$ [Get Disk Free Space] is only partly supported due to the use of flash memory instead of a hard disk. Likewise, Function 33$h$ [Get/Set System Value] is supported in terms of function and flag, but the "Control-Break" function is not supported. Similarly, Function 2A$h$ through 2D$h$ [Get/Set Date/Time functions] is only partially supported because no real time hardware is provided in the terminal of the present invention. The "Get Time" function is supported so that it may be used to measure the duration of events, without reflecting absolute time.

In addition, the flash file system of the present invention is, in the presently preferred arrangement, partitioned into multiple single-directory drives. However, unlike conventional disk files, the flash file system includes no clusters or sectors. Files within each drive or partition grow upwards from the bottom of the partition, while directory entries grow downward from the top. Files are stored contiguously, without fragmenting. Directory entries, which are sixteen bytes long in a preferred embodiment, are generally similar to a DOS directory entry; however, elements which would normally be reserved are defined to permit the file to execute out of flash, rather than DRAM. These include the starting address of the file within the flash, as well as the remap segment of the file within the DOS address space.

File deletion, while also similar to deletion of conventional DOS files, also differs in some important details. When a file is deleted in the present invention, the first byte of the directory entry is changed to 0, as opposed to setting it to E5$h$. This step is performed without erasing a flash block. Subsequent files will then be written to the next available space. However, if there is not enough available space for the subsequent files, the flash block for the deleted file is erased and undeleted files are rewritten to the flash block where the deleted file had been maintained. As noted before, file fragmentation is not permitted in at least some embodiments.

The flash file system supports conventional DIR, TYPE and DEL commands, supports a new "DEBUGMSG" command for generating a DEBUG message, and also supports program execution through batch files. The file system also supports the AUTOEXEC.BAT file, as well as loading and executing of .EXE and .COM files, and Int 21$h$ and Int 27$h$. However, the file system does not support, in at least some embodiments, the CONFIG.SYS file or .SYS device drivers. Likewise, the file system does not support batch file commands (except program execution), I/O redirection, pipes, or interrupts 20h [Program Terminate], 22h [Terminate Address], 23h [Ctrl-Break Exit Address], 24h [Critical Error Handler Vector], 25h [Absolute Disk Read], 26h [Absolute Disk Write], and 2Fh [Multiplex Interrupt].

From the foregoing, it will be apparent that, while a selected group of the standard BIOS and DOS functions are emulated or otherwise supported by the terminal operating system of the present invention, a very significant number of standard BIOS and DOS functions are not supported. In addition, even those BIOS and DOS functions which are supported are not executed by standard AT-compatible hardware. Instead, the portion of the terminal operating system referred to in FIG. 4 as the "boot block" 300 and the "kernel" 305 establishes the ability to emulate these functions.

The service functions supported by the boot block 305 include: GET FLASH DRIVE SIZE, which interrogates the flash memory 438 for drive size; READ FLASH DRIVE, for reading data from the flash memory 438; WRITE FLASH DRIVE; GET FLASH DRIVE BLOCK SIZE, for interrogating the block size of the memory 438; ERASE FLASH DRIVE BLOCK, for erasing data from the memory 438; WARM REBOOT, used by the manufacturing test to loop through the power-on diagnostics repeatedly but not used in normal operation; GET BOOT BLOCK DATE; CLEAR KEYBOARD CONTROLLER I/O BIT, used to control components connected to the keyboard controller; and SET KEYBOARD CONTROLLER I/O BIT.

The operation of the kernel 305 is shown in greater detail. In particular, the kernel includes three service functions. The first is an "ACTIVATE VIDEO INT 10h" function, which enables the normal int 10h functions for video services. The interrupt int 10h is initially intercepted by the kernel 305 to suppress the display of text-mode messages from the various device drivers while those drivers are loaded. After the drivers are loaded and the terminal enters graphics mode, the ACTIVATE VIDEO INT 10h function is called to restore normal int 10h operation. In addition, the kernel 305 includes a second function, "SET POWER DOWN TIME," which can set various power saving functions (such as Energy Star compliance) and the delay timer for activating such features. Finally, the kernel 305 includes a "PROCESS DOS INTERRUPTS" function, which can be called from the boot block or other portions of the kernel 305 anytime necessary to process pending DOS interrupts which require real time processing in a DOS environment. The interrupts most often processed by this function are mouse and keyboard interrupts, although they may include timer, serial, parallel and network interrupts. The interception by this function prevents, for example, mouse and keyboard interrupts from being disabled for an excessive period—i.e., long enough to be an annoyance to a user, for example a delay of about one second between a movement of the mouse and a responsive movement of the cursor—and to flush the keyboard controller's output when it becomes necessary to send a command to the keyboard controller.

Since the hardware of the present invention does not comply with the PC/AT standard, and the firmware does not comply with either conventional PC/AT BIOS or DOS, but the overall system is intended to permit the user to view and interact with a conventional Windows display, some conventional hardware interrupts and related calls must be managed by the present invention. In a preferred embodiment, such interrupts and calls are handled in the terminal firmware, either by emulating or modifying the appropriate response to the incoming signal. Such responses will be treated in greater detail in connection with the software kernel described hereinafter.

The kernel puts the processor in virtual 8086 mode and sets up various tables as necessary to intercept I/O to various ports. After an access to a selected port generates an exception, the instruction that generated the exception is disassembled so that the kernel can process it correctly to emulate PC compatibility, thus simplifying the porting of various personalities. Because an entire subroutine is executed for each intercepted I/O instruction, the I/O instruction will not execute as fast, so intercepted I/O is limited to as few ports as possible. In some instances, all or only a portion of an I/O port is interrupted as necessary to provide AT compatibility. It will be appreciated that, while the primary embodiment described herein is intended to provide a Citrix Winframe personality, other personalities could also be implemented for use by the terminal of the present invention. In some instances, the terminal of the present invention may include multiple personalities in memory, with the terminal connected to multiple hosts running different operating systems which expect such differing personalities. The user or others may then be able to select from such personalities through a hot key or other sequence, with the kernel of the present invention then executing the appropriate personality out of memory and permitting communication to the appropriate host.

The I/O ports which are intercepted by the kernel to provide AT compatibility are:

20h [The command port of an AT-compatible interrupt controller]—Only the "end of interrupt" command is emulated, which is issued at the end of every interrupt handler to allow more interrupts of the same or lesser priority to occur. The kernel also emulates the normal operation of a PC-compatible interrupt controller of blocking interrupts of equal or lesser priority until the "end of interrupt" command is received.

21h [The AT-compatible interrupt controller's mask register]—Emulated.

40h–43h [Access to an AT-compatible 8254 system timer]—The ports are not emulated, but are intercepted because some AT-based drivers write to these ports. Since the interrupt mask register of an exemplary embodiment of the present invention is set at port 40h, unintercepted writes would interfere with the interrupt mask register of the present invention.

61h [A miscellaneous control port on an AT architecture]—One speaker control bit is emulated to permit the speaker to be turned on and off.

A0h [The command port of an AT-compatible computer's second interrupt controller]—As with port 20h, the "end of interrupt" command is emulated.

A1h [The mask register for the second interrupt controller (similar to port 21h)]—Emulated.

2F8h through 2FFh [A standard address for an AT second serial port]—The ports are remapped to 5F0h through 5FEh, which are the port addresses for the second serial port of an exemplary embodiment of the present invention. The new port range [5F0–5FE] includes even addresses only. In an exemplary embodiment, byte swapping has not been implemented, and thus only even bytes of the eight bit SIO device can be accessed. However, byte swapping may be implemented if desired.

378h through 37Fh [A standard address for an AT parallel port]—Remapped to 6F0h through 6FEh, which are the port addresses for the parallel port of an exemplary embodiment of the present invention.

3F8h through 3FFh [A standard address for an AT first serial port]—Remapped to 7F0h through 7FEh, which are the port addresses for the first serial port of an exemplary embodiment.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

TABLE 2

| Signal Name | Description | Direction | From/To |
|---|---|---|---|
| A<23:1> | CPU address bus | I | CPU |
| D<15:0> | CPU data bus | I/O | CPU |
| ADS# | CPU address strobe | I | CPU |
| D/C# | Date/Control | I | CPU |
| M/IO# | Memory/Input,output | I | CPU |
| W/R# | Write/Read | I | CPU |
| BHE# | Bus High Enable | I | CPU |
| BLE# | Bus Low Enable | I | CPU |
| DMA<9:0> | DRAM memory address bus | O | DRAM |
| RAS<1:0> | ROW address strobe | O | DRAM |
| UCAS<1:0> | Upper CAS strobe | O | DRAM |
| LCAS<1:0> | Lower CAS strobe | O | DRAM |
| WE# | Write Enable | O | DRAM |
| BD<15:0> | Peripheral data bus | I/O | FLASH,SIO,LAN . . . |
| FLASHCS<1:0># | Flash chip select | O | FLASH |
| COM1CS# | COM port 1 chip select | O | SIO |
| COM2CS# | COM port 2 chip select | O | SIO |
| PRINTERCS# | Printer port chip select | O | SIO |
| IOWR# | Input/output write | O | SIO,KBCTRL,LAN |
| IORD# | Input/output read | O | SIO,KBCTRL,LAN |
| MEMWR# | Memory write | O | FLASH,LAN |
| MEMRD# | Memory read | O | FLASH,LAN |
| 8042CS# | Keyboard Controller chip select | O | KBCTRL |
| SPEN | Speaker Output | O | SPEAKER |
| READY# | Ready | O | CPU |
| RESETI | Reset input | I | RESET |
| RESET# | Reset output(inverted) | O | SIO,KBCTRL |
| RESET | Reset output | O | CPU,VGA,LAN |
| INTA | COM1 interrupt | I | SIO |
| INTB | COM2 interrupt | I | SIO |
| INTP | Printer port interrupt | I | SIO |
| KBINT | Keyboard interrupt | I | KBCTRL |
| MSINT | Mouse interrupt | I | KBCTRL |
| NINT | Network interrupt | I | LAN |
| INTR | Interrupt output | O | CPU |
| CLK2 | System Clock | I | OSC |
| KBCLK | Keyboard controller clock | O | KBCTRL |
| TCLK | Timer Clock | I | OSC |
| CONFIG<3:0> | Configuration Input | I | EXT |
| SLEEP | Screen saver enable | O | MPS |
| PWDOWN | Power Down | O | LOGIC |
| IDCS# | ID port chip select | O | LOGIC |
| DIAGCS# | Diagnostic Port chip select | O | LOGIC |

TABLE 3A

Support for DOS Functions in IO.SYS module:
Function 2 (Display Output): Supported.
Function 6 (Direct Console I/O): Supported.
Function 7 (Direct Console Input Without Echo): Supported.

TABLE 3A-continued

Function 8 (Console Input Without Echo): Supported.
Function 9 (Display String): Supported.
Function 0Ah (Buffered Keyboard Input): Supported.
Function 0Bh (Check Standard Input Status): Supported.
Function 0Ch (Clear Keyboard Buffer and Invoke a Keyboard Function): Supported.
Function 0Eh (Select Disk): Supported.
Function 19h (Current Disk): Supported.
Function 1Ah (Set Disk Transfer Address): Supported.
Function 25h (Set Interrupt Vector): Supported.
Function 26h (Create New Program Segment): Supported.
Function 2Ah (Get Date): Partially supported.
Function 2Ch (Get Time): Partially supported.
Function 2Dh (Set Time): Partially supported.
Function 2Fh (Get Disk Transfer Address (DTA)): Supported.
Function 30h (Get DOS Version Number): Supported.
Function 31h (Terminate Process and Remain Resident): Supported.
Function 33h (Get/Set System Value): Function and flag -- supported; Ctrl-Break operation -- not supported.
Function 35h (Get Interrupt Vector): Supported.
Function 36h (Get Disk Free Space): Supported, but allocation parameters returned are somewhat arbitrary because the flash drive is not composed of sectors and clusters.
Function 3Ch (Create a File): Supported.
Function 3Dh (Open a File): Supported, but not all modes are distinguished.
Function 3Eh (Close a File Handle): Supported.
Function 3Fh (Read from a File or Device): Supported for files but not devices.
Function 40h (Write to a File or Device): Supported for files and STDOUT device. The flash file system imposes restrictions on file write operations.
Function 41h (Delete a File): Supported.
Function 42h (Move File Read/Write Pointer): Supported, but the flash file system imposes restrictions on this function for files open in write mode.
Function 43h (Change File Mode): Unsupported (returns an error).
Function 44h (I/O Control For Devices): This function contains many subfunctions, most of which are unsupported. Most of the subfunctions that are supported return arbitrary or "hard-coded" parameters.
Function 47h (Get Current Directory): Supported.
Function 48h (Allocate Memory): Supported.
Function 49h (Free Allocated Memory): Supported.
Function 4Ah (Modify Allocated Memory Blocks): Supported.
Function 4Bh (Load or Execute a Program): Supported, but the environment and FCB parameters are not processed.
Function 4Ch (Terminate a Process): Supported.
Function 4Dh (Get Return Code of a Subprocess): Supported.
Function 4Eh (Find First Matching File): Supported.
Function 4Fh (Find Next Matching File): Supported.
Function 52h (Undocumented: Return DOS List of Lists): Partially supported.
Function 56h (Rename a File): Supported.
Function 57h (Get/Set File's Date and Time): Supported for "Get File's Date and Time:" but not for "Set File's Date and Time".
Function 58h (Undocumented: Get/Set Memory Allocation Strategy): Returns normally, but the function is not supported.
Function 5Dh (Undocumented): Unsupported, but returns normally if AL = 9.
Function 62h (Get Program Segment Prefix Address): Supported.
PARTIALLY SUPPORTED DOS (IO.SYS) FUNCTIONS:
Function 44h (I/O Control For Devices):
Subfunction 0 (Get Device Information): Supported, but only bits 0, 1, 7, and 14 are supported in the information word are supported.
Subfunction 8 (Check For Removability): Supported.
Subfunction 9 (Check For Network): Supported (always returns 0).
Subfunction Eh (Check for Drive Aliases): Supported (always returns 0).
Function 52h (Undocumented: Return DOS List of Lists): Returns a pointer to the "List of Lists". Most of these data structures are not initialized, but the second dword of the "List of Lists" points to some system file table data, and the third word of that region is set to thirty to prevent our Citrix client from failing. (This location is where DOS stores its value for "FILES=".)

TABLE 3B

Functions not listed are not supported.
The following features are supported by COMMAND.COM
- DIR command
- TYPE command
- DEL command
- DEBUGMSG command to toggle DOS debug messages on and off
- program execution through batch files
- AUTOEXEC.BAT file
The following features are supported by DOS
- loading and executing of .EXE and .COM files [DOS and Int 21h]
- Int 21h (as defined by the functions above)
- Int 27h (Terminate but Remain Resident)
The following features are NOT supported:
- CONFIG.SYS file and .SYS device drivers
- batch file commands other than program execution
- I/O redirection
- pipes
- most internal and external commands
- Int 20h (Program Terminate)
- Int 22h (Terminate Address)
- Int 23h (Ctrl-Break Exit Address)
- Int 24h (Critical Error Handler Vector)
- Int 25h (Absolute Disk Read)
- Int 26h (Absolute Disk Write)
- Int 2Fh (Multiplex Interrupt)

TABLE 3C

BIOS FUNCTIONS SUPPORTED IN IO.SYS:
Interrupt 5 (Print Screen): Supported.
Interrupt 8 (Timer Interrupt): Supported.
Interrupt 9 (Keyboard Hardware Interrupt): Supported.
Interrupt 10h (Video Services): Supported with the Cirrus Logic BIOS.
Interrupt 11h (Equipment Report): Supported.
Interrupt 12h (Memory Size Report): Supported.
Interrupt 14h (Serial Port Services): Supported.
Interrupt 15h (Miscellaneous Services): Partially supported.
Interrupt 15h/C2h (Mouse Services): Mostly supported.
Interrupt 16h (Keyboard Services): Partially supported.
Interrupt 1Ah (Timer/RTC Services): Timer functions supported; RTC functions not supported.
Interrupt 1Ch (User Timer): Supported.
Segment 40h is reserved as the BIOS data area, but only some locations are used.
BIOS FUNCTIONS PARTIALLY SUPPORTED IN IO.SYS:
Interrupt 5 (Print Screen): Unsupported.
Interrupt 15h (Miscellaneous Services):
    Subfunction C0h (Return System Configuration Parameters):
        Returns a pointer to a configuration table.
    Subfunction C2h (Mouse Services):
        Subfunction 0 (Enable/Disable Pointing Device): Supported.
        Subfunction 1 (Reset Pointing Device): Supported.
        Subfunction 2 (Set Sample Rate): Supported.
        Subfunction 3 (Set Resolution): Supported.
        Subfunction 4 (Read Device Type): Unsupported.
        Subfunction 5 (Pointing Device Interface Initialization): Unsupported.
        Subfunction 6 (Return Status; Set Scaling): Supported.
        Subfunction 7 (Device Driver Far Call Initialization): Supported.
[All other interrupt 15h subfunctions are unsupported.]
Interrupt 16h (Keyboard Services):
    Subfunction 0 (Keyboard Read): Supported.
    Subfunction 1 (Keystroke Status): Supported.
    Subfunction 2 (Shift Status): Supported.
    Subfunction 3 (Set Typematic Rate): Unsupported.
    Subfunction 4 (Keyboard Click Adjustment): Unsupported.
    Subfunction 5 (Keyboard Write): Supported.
    Subfunction 10h (Extended Keyboard Read): Supported.
    Subfunction 11h (Extended Keystroke Status): Supported.
    Subfunction 12h (Extended Shift Status): Supported.

We claim:

1. A terminal for displaying application program information in a windowing environment comprising:

processing means, not fully compatible with personal computer BIOS or disk operating systems and incapable of executing windowing applications locally, adapted to receive windowing information supplied by programs executing on a remotely located application server, and display means for displaying the windowing information.

2. A terminal adapted for communicating with a selected one of a plurality of host systems, each of said host systems using a different communications protocol, comprising a first personality for providing responses to a first set and a second set of instructions supplied by a first host system in accordance with the communications protocol associated with that first host system, at least a second personality for providing responses to a third set and a fourth set of instructions supplied by a second host system in accordance with the communications protocol associated with that second host system, at least one of said host systems providing program information, processor means responsive to the first and at least the second personalities for processing one of the first and third sets of instructions and for emulating one of the second and fourth sets of instructions and incapable of executing windowing applications locally, to provide to the associated host system responses compatible with the communications protocol associated with that host system, and switching means for identifying the host system to which the terminal is currently connected and selecting the appropriate one of the first and at least the second personalities for communications with the Identified host system.

3. A terminal for displaying, in the Microsoft Windows® operating environment, application program information provided by a host system running a Microsoft Windows® operating systems comprising:

interface means for receiving from the application server display information for a windowing application operating on the application server, processing means, not fully compatible with personal computer BIOS or disk operating systems and incapable of executing the windowing application locally, responsive to the interface means for either emulating or processing instructions supplied by programs executing on a remotely located application server to provide to the host system responses compatible with those expected by the host system, display means responsive to the processing means for displaying the windowing information.

\* \* \* \* \*

UNITED STATES PATENT AND TRADEMARK OFFICE
CERTIFICATE OF CORRECTION

Page 1 of 3

PATENT NO. : 5,918,039
APPLICATION NO. : 08/581168
DATED : June 29, 1999
INVENTOR(S) : Randy Buswell et al.

It is certified that error appears in the above-identified patent and that said Letters Patent is hereby corrected as shown below:

IN THE DRAWINGS:

At Sheet 7, FIGURE 7B1, insert --748, 750, 715-- and --746-- and their corresponding arrows, and insert --780-- and --782--, as shown below:

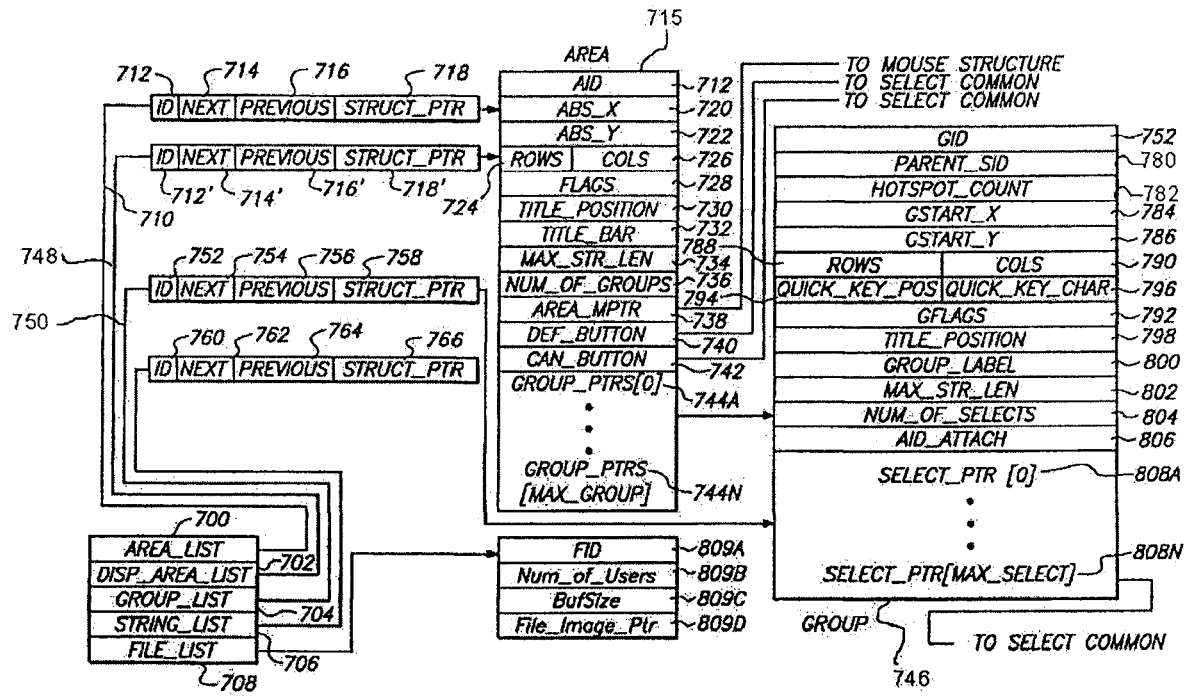

FIG. 7B1

Signed and Sealed this
Fourth Day of September, 2012

David J. Kappos
*Director of the United States Patent and Trademark Office*

CERTIFICATE OF CORRECTION (continued)

U.S. Pat. No. 5,918,039

IN THE DRAWINGS:

At Sheet 8, FIGURE 7B2, insert --810-- and its arrow, as shown below:

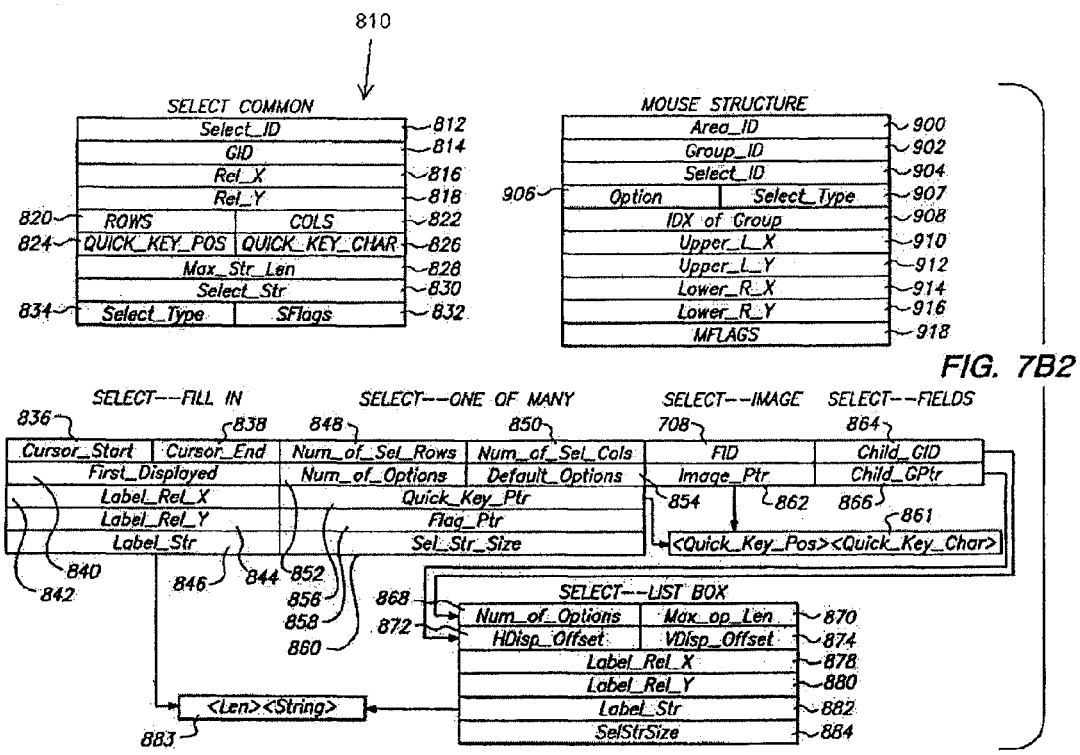

FIG. 7B2

Sheet 9, FIGURE 7B3, insert --950-- and its arrow, as shown below:

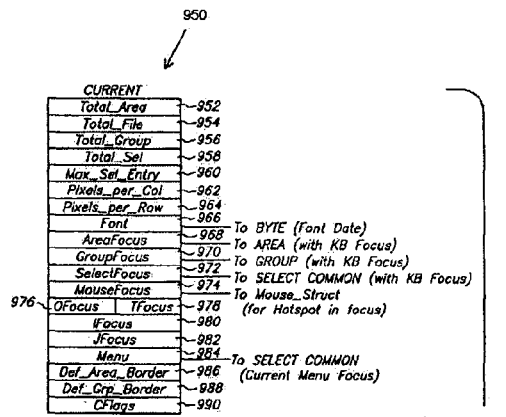

FIG. 7B3

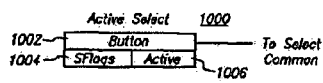

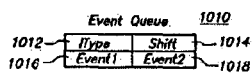

CERTIFICATE OF CORRECTION (continued)
U.S. Pat. No. 5,918,039

IN THE SPECIFICATION:

| | |
|---|---|
| Column 4, Line 32: | Replace "other" with --another-- after the phrase "coaxial cable, or" |
| Column 10, Line 52: | Replace "436" with --440-- after the phrase "connection data files" |
| Column 10, Line 57: | Replace "436" with --440-- after the phrase "connection data files" |
| Column 11, Line 41: | Replace "714" with --715-- after the phrase "The area structure" |
| Column 11, Line 39: | Replace "714" with --715-- after the phrase "the area structure" |
| Column 11, Line 57: | Replace "714" with --715-- after the phrase "the area structure" |
| Column 12, Line 14: | Replace "a" with --as-- after the phrase "as well" |
| Column 12, Line 34: | Replace "714" with --715-- after the phrase "the area structure block" |
| Column 13, Line 10: | Replace "option" with --options-- after the phrase "number of" |
| Column 13, Line 34: | Remove --and 910-- after the phrase "entries 908" |
| Column 13, Line 36: | Replace "912A-D" with --910, 912, 914, 91-- after the phrase "four entries" |
| Column 13, Line 38: | Replace "914" with --918-- after the phrase "together with an entry" |
| Column 13, Line 51: | Replace "," with --and-- after the phrase "have been defined" |
| Column 13, Line 64: | Replace "986" with --984-- after the phrase "menu entry" |
| Column 13, Line 65: | Replace "988 and 990" with --986 and 988-- after the phrase "together with entries" |